(12) United States Patent
Washizawa (10) Patent No.: US 7,987,073 B2
(45) Date of Patent: Jul. 26, 2011

(54) METHOD AND APPARATUS OF OPTIMALLY DESIGNING A STRUCTURE

(75) Inventor: Teruyoshi Washizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 459 days.

(21) Appl. No.: 10/812,868

(22) Filed: Mar. 31, 2004

(65) Prior Publication Data
US 2004/0199365 A1 Oct. 7, 2004

(30) Foreign Application Priority Data

Apr. 4, 2003 (JP) ................ 2003-102138
Apr. 4, 2003 (JP) ................ 2003-102139

(51) Int. Cl.
*G06F 17/10* (2006.01)
(52) U.S. Cl. ............................... 703/2; 700/97
(58) Field of Classification Search .......... 703/1–2; 700/97, 13, 117
See application file for complete search history.

(56) References Cited

U.S. PATENT DOCUMENTS

| 5,815,394 A * | 9/1998 | Adeli et al. ............ 700/97 |
| 5,926,403 A | 7/1999 | Ho et al. ............ 364/578 |

FOREIGN PATENT DOCUMENTS

| JP | 09-230963 | 9/1997 |
| JP | 09-245072 | 9/1997 |
| JP | 09-311852 | 12/1997 |
| JP | 10-260999 | 9/1998 |
| JP | 2001134628 A * | 5/2001 |

OTHER PUBLICATIONS

Patnaik, Surya et al. "Merits and Limitations of Optimality Criteria Method for Structural Optimization." NASA Technical Paper 3373, 1993.*

Dickinson, J.K. et al. "Preconditioned Conjugate Gradient Methods for Three Dimensional Linear Elasticity." Univerity of Waterloo, 1993.*

(Continued)

*Primary Examiner* — Kamini S Shah
*Assistant Examiner* — Cuong V Luu
(74) *Attorney, Agent, or Firm* — Fitzpatrick, Cella, Harper & Scinto (57) ABSTRACT

A method of optimally designing a structure includes a step of obtaining a solution of a structure optimal designing problem having a first solution process to solve an optimization problem of a first evaluation function for a status variable vector and a design variable vector, wherein the status variable vector is a displacement in each node, and the design variable vector is a rate of existence to a structural member in each element. The first solution process has a design variable update step of reading the design variable vector and the status variable vector stored in a first storage unit, updating the design variable vector, and storing the updated design variable vector into the first storage unit, and a status variable update step of reading the design variable vector and the status variable vector stored in a second storage unit, updating the status variable vector, and storing the updated status variable vector into the second storage unit. The status variable update step includes a second solution process to solve an optimization problem of a second evaluation function for the status variable vector and the design variable vector, wherein the second evaluation function corresponds a norm of a residual vector which is obtained as a difference between a nodal force vector and the status variable vector on which a global stiffness matrix is operated, and the status variable vector is not initialized upon start of the second solution process. An output step outputs the obtained solution.

5 Claims, 7 Drawing Sheets

OTHER PUBLICATIONS

Lingen, Frederik. "A Generalised Conjugate Residual Method for the Solution of Non-Symmetric Systems of Equations with Multiple Right-Hand Sides." 1999, John Wiley & Sons.*

Chickermane, Hermant et al. "Structural Optimization Using a New Local Approximization Method." 1996 John Wiley & Sons.*

Bendsoe, Martin P. "Recent Developments in Topology Design of Materials and Mechanisms." ESAIM Proceedings, vol. 11, 2002, pp. 41-60.*

S. Bulman, et al., "Comparisons Between Algorithms for Structural Topology Optimization Using a Series of Benchmark Studies", Computers & Structures, 79, pp. 1203-1218 (2001).

Y.L. Hsu, et al., "Interpreting Results from Topology Optimization Using Density Contours", Computers & Structures, 79, pp. 1049-1058 (2001).

C. Fleury, "CONLIN: An Efficient Dual Optimizer Based on Convex Approximation Concepts", Structural Optimization, 1, pp. 81-89 (1989).

K. Hayami, "On the Convergence of Krylov Subspace Methods for Singular Systems", National Institute of Informatics, Tokyo, p. 1265 (2002).

K. Hayami, "NII Technical Report (NII-2001-002E)", NII Technical Reports, National Institute of Informatics (2002).

S.L. Zhang, et al., "Necessary and Sufficient Conditions for the Convergence of Orhomin(k) on Singular and Inconsistent Linear Systems", Numerrische Mathematik, 87, pp. 391-405 (2000).

T. Washizawa et al., "A New Approach for Solving Singular Systems in Topology Optimization Using Krylov Subspace Methods", Struct Multidisc Optim 28, Jul. 27, 2004, pp. 330-339, s00158-004-0439-3.

* cited by examiner

| | |
|---|---|
| PRIMARY STORAGE UNIT (RAM/ROM) | 204 |
| DATA STORAGE AREA | 214 |
| x(STATUS VARIABLE VECTOR) | 214a |
| f(DESIGN VARIABLE VECTOR) | 214b |
| $L_1$(STATUS VARIABLE VECTOR EVALUATION FUNCTION) | 214c |
| $L_2$(DESIGN VARIABLE VECTOR EVALUATION FUNCTION) | 214d |
| $B_1$(STATUS VARIABLE BOUNDARY CONDITION) | 214e |
| $W_0$(DESIGN VARIABLE WEIGHT CONDITION) | 214f |
| $X^{(0)}, f^{(0)}$(INITIAL VALUE) | 214g |
| $\lambda$(LAGRANGE'S UNDETERMINED CONSTANT) | 214h |
| A(ELEMENT STIFFNESS MATRIX) | 214i |
| k(ITERATIVE NUMBER OF DESIGN VARIABLE CHANGES) | 214j |
| C(SENSITIVITY COEFFICIENT) | 214k |
| r(RESIDUAL VECTOR) | 214m |
| p(SEARCH DIRECTION VECTOR) | 214n |
| $r^{(0)}, p^{(0)}$(INITIAL VALUE) | 214p |
| t(ITERATIVE NUMBER OF STATUS VARIABLE CHANGES) | 214q |
| b(NODAL FORCE VECTOR) | 214r |
| OTHERS | 214s |
| PROGRAM STORAGE AREA | 224 |

| | |
|---|---|
| SECONDARY STORAGE UNIT (DISK, CD etc) | 205 |
| DATA STORAGE AREA | 215 |
| VARIOUS INITIAL VALUES | 215a |
| VARIOUS CONDITIONS | 215b |
| DUAL OPTIMAL SOLUTION PROBLEM DATABASE | 215c |
| PROGRAM STORAGE AREA | 225 |
| OPTIMALITY CRITERIA MODULE | 225a |
| SEQUENTIAL CONVEX FUNCTION APPROXIMATE MODULE | 225b |
| SEQUENTIAL LINEAR PROGRAMMING MODULE | 225c |
| OTHER DESIGN VARIABLE MODULES | 225d |
| CONJUGATE RESIDUAL MODULE | 225e |
| GCR MODULE | 225f |
| GCR(k) MODULE | 225g |
| Orthomin(k) MODULE | 225h |
| GMRES(k) MODULE | 225i |
| OTHER STATUS VARIABLE MODULES | 225j |

METHOD AND APPARATUS OF OPTIMALLY DESIGNING A STRUCTURE

FIELD OF THE INVENTION

The present invention relates to a method of optimally designing a structure through a solution of design parameter optimization problem and its apparatus, and more particularly, to an automatic designing technique for shape optimization including a structural member topology.

BACKGROUND OF THE INVENTION

Optimal designing of structural topology is a problem to determine an optimal topology and shape size of structural members under a given condition. Hereinbelow, the structural member topology and shape size will be referred to as "design argument functions", and the above decision problem will be referred to as a "design argument function optimization problem". The term "argument function" is used since the topology and shape size are three-dimensional functions. In a design argument function optimization problem, an optimization problem of status argument function must be solved for values of each design argument function. From this meaning, the structural topology optimal designing can be regarded as a dual structure optimization problem having a status argument function optimization problem inside and a design argument function optimization problem outside.

In the inner status argument function optimization problem, the concept, based on accumulated technologies of dividing space into a finite number of elements is employed. Particularly in a problem with strain energy of structural member as an evaluation functional, a finite element method is generally applied as an analysis method. As a solution of finite element method, a direct method to linear equation is employed.

On the other hand, as to the design argument function optimization problem, briefly the following 3 types of methods are provided (See non-patent document 1 or 2).
1. Evolutionary method (hereinbelow, "E method")
2. Homogenization method (hereinbelow, "H method")
3. Material distribution method (hereinbelow, "MD method) or Density method (hereinbelow, "D method")

In the E method, each subspace obtained by space division is called a cell, and generation and deletion of cell is repeated in accordance with an appropriate rule. The structural members are given as a set of finally existing cells. As only two status, whether a cell exists or not, are permitted, clear structural members can be obtained. Further, as differential information of evaluation functional is not used, there is no trap in local optimal solution. Accordingly, the method is effective in a case where the evaluation functional is polymodal. In patent document 1, provided is a framed structural member optimization designing apparatus using a genetic search method which is a kind of the E method. The problem of conventional technical art, which has required trial computation based on accumulated know-how and which cannot be applied to an actual designing problem having a large number of design variables, is solved by the optimization designing apparatus, by the following arrangement. That is, an approximation optimization computer using an approximation equation for discrete design variable data such as frame member cross-sectional size, and a detailed optimization computer using the design variable data are provided, and these two computers are combined to a framed structural member optimization designing apparatus.

The H method enables use of sensitivity analysis by assuming a further fine structure as structural elements positioned in divided respective areas and introducing a design argument function taking a continuous value. The sensitivity analysis is an analysis method utilizing differential information of evaluation functional for a design argument function. If the sensitivity analysis is possible, an iterative solution such as a gradient method can be used. In comparison with a round-robin method such as the E method, at least computation time of search related to local optimal solution can be greatly reduced (See non-patent document 3).

The MD method or the D method represents changes in topology and shape size of structural members by allocating real numbers ranging from 0 to 1 indicating the rate of existence to respective structural members. These methods are similar to the H method in that the sensitivity analysis is enabled by replacing the discrete information as to whether or not a structural member exists with a continuous value of the rate of existence. However, as the number of parameters is smaller than that in the H method, the MD and the D method can be easily modeled and has a wide range of application.

The non-patent document 4 discloses a structure phase optimization method by the D method. The method has the following features. As a voxel finite element method (division of space at equal intervals) is employed, an element stiffness matrix is the same for every element. Accordingly, once the element stiffness matrix is computed, it can be used in subsequent computation. Further, as the elements are regularly arranged, it is not necessary to store nodal number information of the respective elements. As a conjugate gradient method with preconditioning and an element-by-element method are combined to solve a large scale simultaneous linear equations, a solution can be obtained without formation of global stiffness matrix. Thus the necessary memory capacity is small.

In the homogenization method, 6 design variables (in the case of three dimensional structure) are required for 1 element. Further, the element stiffness matrix must be re-calculated upon each change of design variable. On the other hand, if the density method to represent the rate of existence of structural number as a density ratio is employed, the number of design variables to 1 element is 1. In addition, the change of design variable does not influence the element stiffness matrix.

[Patent Document 1]
Japanese Patent Application Laid-open No. 11-314631
[Non-patent Document 1]
S. Bulman, J. Sienz and E. Hinton: "Comparisons between algorithms for structural topology optimization using a series of benchmark studies", Computers and Structures, 79, pp. 1203-1218 (2001)
[Non-patent Document 2]
Y-L. Hsu, M-S. Hsu and C-T. Chen: "Interpreting results from topology optimization using density contours", Computers and Structures, 79, pp. 1049-1058 (2001)
[Non-patent Document 3]
Hiroshi Yamakawa: "Optimization design", Computational Mechanics and CAE series 9, Baifu-kan (1996)
[Non-patent Document 4]
Fujii, Suzuki and Ohtsubo: "Structure phase optimization using boxel finite element method", Transactions of JSCES, Paper No. 20000010 (2000).

However, the above conventional techniques have the following drawbacks.

Generally, a structure optimization problem is formulated as a dual optimization problem including a status variable vector optimization problem at each repetitive step of design variable vector optimization problem. Assuming that the design variable vector optimization problem is referred to as an external optimization and the status variable vector optimization problem is referred to as an internal optimization, the internal optimization is a problem to obtain a status variable vector with a design variable vector as a parameter, i.e., the design variable vector being fixed. This problem is generally called structural analysis, which can be solved by using solution of linear equation with a finite element method.

However, if the structure has changed and a structural member in an area does not exist, e.g., a hole is formed in a member, the design variable corresponding to the element becomes 0. As a result, the Young's modulus of the element becomes 0. Then the coefficient matrix of the linear equation is not full-ranked, and the problem cannot be solved by a direct method since an inverse matrix cannot be calculated.

In the conventional art, when a design variable vector becomes 0, the following countermeasures are taken.

The equations are re-formed such that the coefficient matrix becomes full-ranked, i.e., the number of ranks and that of equations are equal.

Otherwise, the value of the design variable vector is replaced with a small value approximate to 0.

However, in the former method, as the equations may be updated upon each update of the design variable vector, it takes much computation time.

Further, in the latter method, setting the element design variable to a small value means that a physically thin film or a weak member exists. That is, in the conventional art, as a portion where material does not exist cannot be accurately represented, there is some doubt in the accuracy of obtained computation result.

SUMMARY OF THE INVENTION

The present invention has been made in consideration of the above drawbacks of the conventional art, and provides a structure optimal designing method and its apparatus for execution of computation without particular processing even when a global stiffness matrix becomes singular, thereby simplifying a program and further reducing the amount of computation.

According to the present invention, provided is a method of optimally designing a structure comprising a step of obtaining a solution of a structure optimal designing problem, formulated as a dual optimization problem having a first solution process to solve an optimization problem of a first evaluation functional for a status variable vector and a design variable vector and a second solution process to solve an optimization problem of a second evaluation functional for the status variable vector and the design variable vector. When the status variable vector is a displacement in each node, and the design variable vector is an existence ratio of a structural member in each element, the first solution process includes the second solution process as one step, and further includes a design variable update step of reading the design variable vector and the status variable vector stored in a first storage unit, updating the design variable vector, and storing the updated design variable vector into the first storage unit, and the second solution process includes a status variable update step of reading the design variable vector and the status variable vector stored in a second storage unit, updating the status variable vector, and storing the updated status variable vector into the second storage unit. The second evaluation function at the second solution process comprises a norm of residual vector, and the status variable vector is not initialized upon start of the second solution process.

Note that at the second solution process, any one of a conjugate residual method, a GCR method, a GCR(k) method, an Orthomin(k) method, a GMRES(k) method and their derivative methods is executed. Further, at the second solution process, any one of a conjugate residual method, a GCR method, a GCR(k) method, an Orthomin(k) method, a GMRES(k) method and their derivative methods is executed.

Further, according to the present invention, provided is a method of optimally designing a structure comprising a step of obtaining a solution of a structure optimal designing problem, formulated as a dual optimization problem having a first solution process to solve an optimization problem of a first evaluation functional for a status variable vector and a design variable vector and a second solution process to solve an optimization problem of a second evaluation functional for the status variable vector and the design variable vector. When the status variable vector is a displacement in each node, and the design variable vector is an existence ratio of a structural member in each element, the first solution process including the second solution process as one step, and further including a design variable update step of reading the design variable vector and the status variable vector stored in a first storage unit, updating the design variable vector, and storing the updated design variable vector into the first storage unit, and the second solution process comprising a conjugate gradient method, and including a preconditioning step of executing preconditioning on a nodal force vector based on a global stiffness matrix, and a status variable update step of reading the design variable vector and the status variable vector stored in a second storage unit, updating the status variable vector, and storing the updated status variable vector into the second storage unit. The status variable vector is not initialized upon start of the second solution process.

Note that at the first solution process, any one of a sequential linear programming method, an optimality criteria method, and a sequential convex function approximate method is performed. Further, at the preconditioning step, a component in a row or column of the nodal force vector is set to 0 when a diagonal component in the corresponding row or column of the global stiffness matrix becomes 0.

According to the present invention, further provided is an apparatus performing the above mentioned methods and a program to be executed by the apparatus performing the above mentioned methods.

In accordance with the present invention as described above, even if a global stiffness matrix becomes singular, computation can be executed without particular processing, thereby a program can be simplified, and further, the amount of computation can be reduced.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Hereinbelow, the construction and operation of a structure optimal designing apparatus to realize a structure optimal designing method according to the present invention will be described.

<Construction of Structure Optimal Designing Apparatus>

Figure 1:
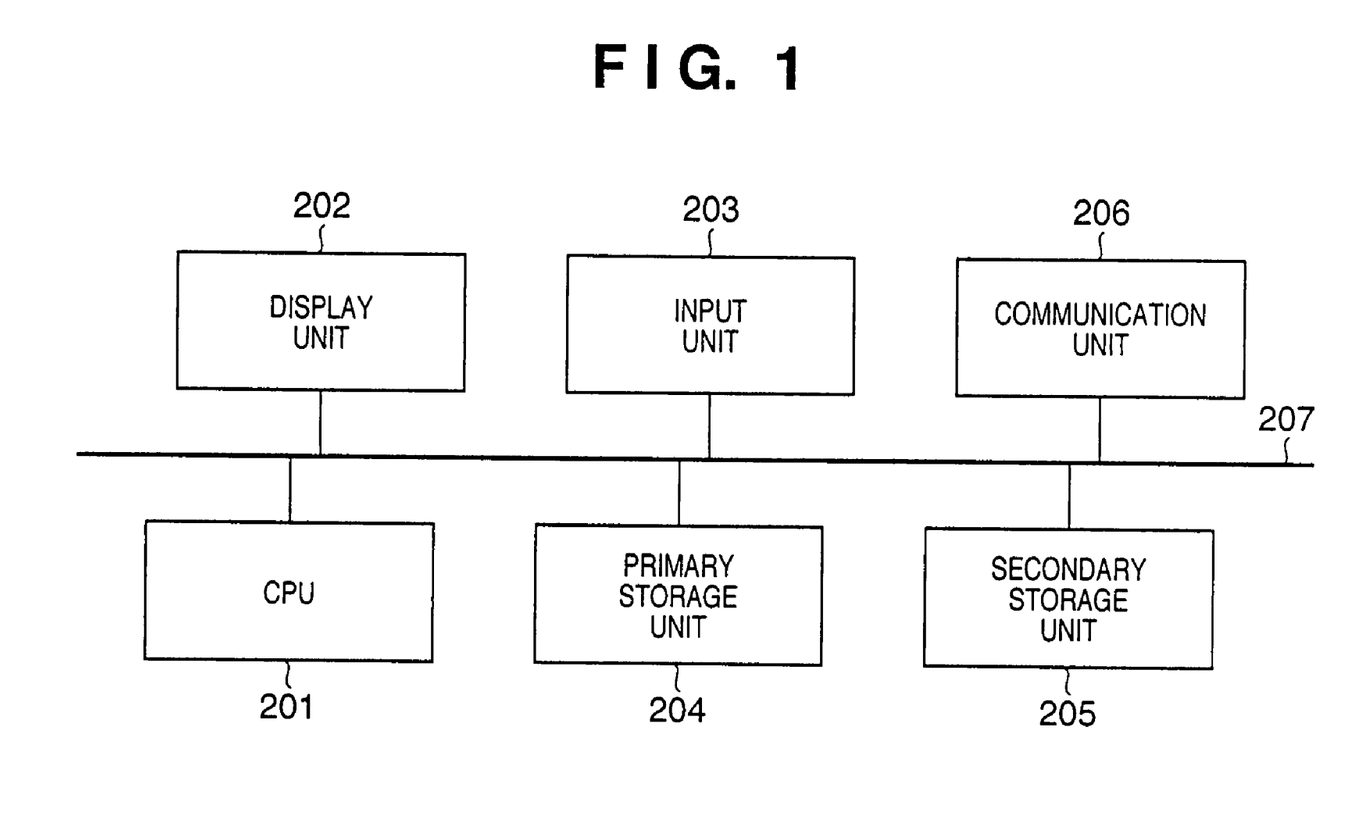
FIG. 1 is a block diagram showing the construction of a structure optimal designing apparatus according to an embodiment of the present invention.

FIG. 1 shows the construction of the structure optimal designing apparatus according to an embodiment of the present invention.

In FIG. 1, reference numeral 201 denotes a CPU for computation and control; 202, a display unit; 203, an input unit; 204, a primary storage unit; 205, a secondary storage unit; 206, a communication unit; and 207, a bus line. Note that constituent elements in the present embodiment are stored, as programs, in the secondary storage unit 205 in advance, loaded into the primary storage unit by command input from the input unit 203 or the communication unit 206, and executed by the CPU 201.

Figure 2:
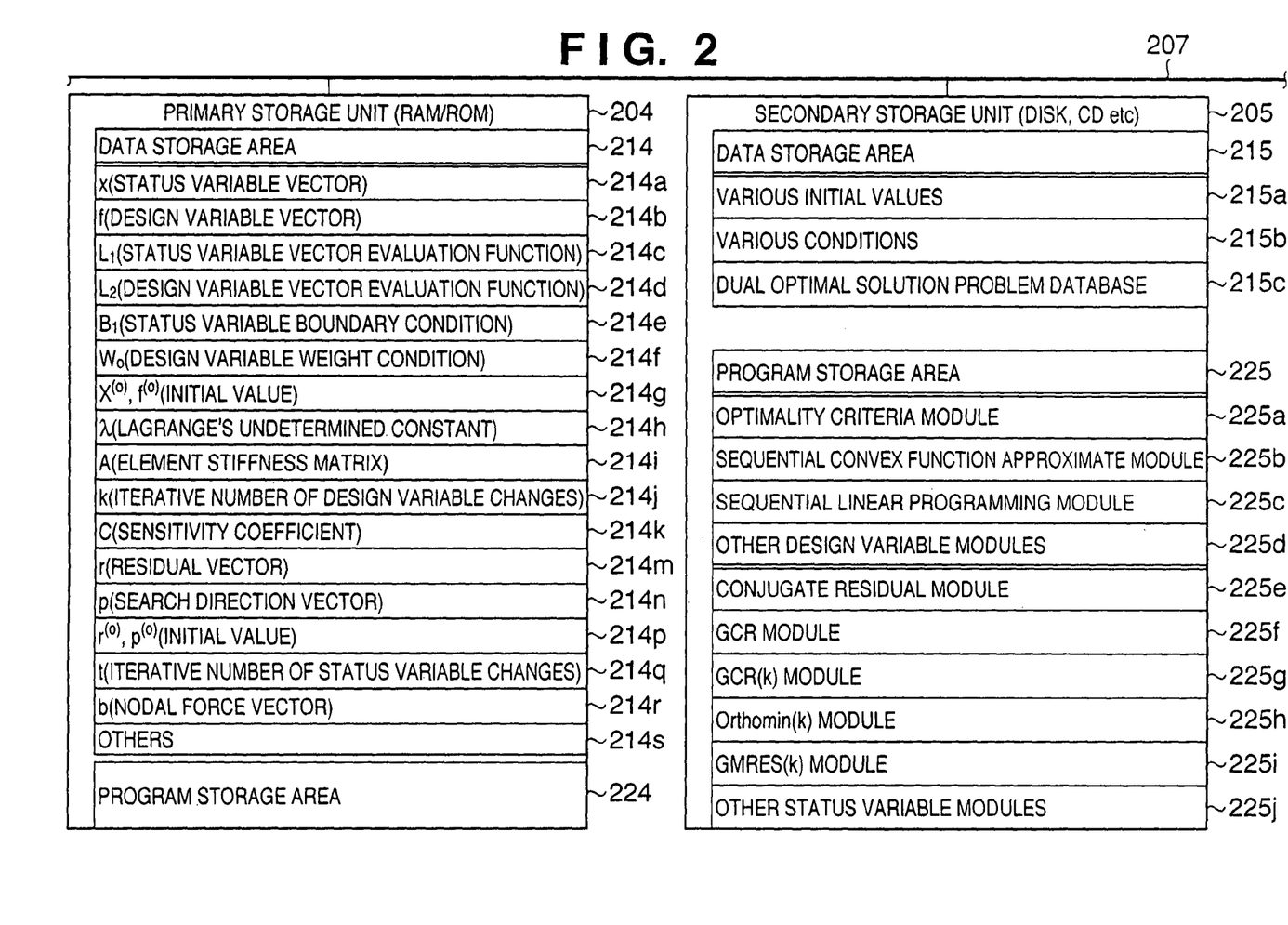
FIG. 2 shows structures of primary storage device and secondary storage device in FIG. 1.

FIG. 2 shows data and programs stored in the primary storage unit 204 and the secondary storage unit 205 to realize the structure optimal designing method according to the present embodiment.

The primary storage unit 204 comprising a RAM or ROM has a data storage area 214 and a program storage area 224. In FIG. 2, the unchanged and resident OS and BIOS programs and unchanged parameters for the OS and BIOS are not shown. Various data to realize the structure optimal designing of the present embodiment are temporarily stored in the data storage area 214. Among these data, re-used/repetitively-used data must be temporarily stored. Data not requiring storage are not necessarily temporarily stored.

For example, the data storage area 214 holds x (status variable vector) 214a, f (design variable vector) 214b, $L_1$ (status variable vector evaluation function) 214c, $L_2$ (design variable vector evaluation function) 214d, $B_1$ (status variable boundary condition) 214e, $W_0$ (design variable weight condition) 214f, $X^{(0)}$ or $f^{(0)}$ (initial value) 214g, λ (Lagrange undetermined constant) 218h, A (element stiffness matrix) 214i, k (number of repetitive design variable changes) 214j, C (sensitivity coefficient) 214k, r (residual vector) 214m, p (search direction vector) 214n, $r^{(0)}$ or $p^{(0)}$ (initial value) 214p, t (number of repetitive status variable changes) 214q, b (nodal force vector) 214r, and other data 214s. On the other hand, programs loaded from the secondary storage unit 205 or the communication unit 206 are stored in the program storage area 224 and executed by the CPU 201.

Preferably, the secondary storage unit 205 is an external large capacity memory and more preferably is a removable memory such as a floppy disk or a CD. The secondary storage unit 205 also has a data storage area 215 and a program storage area 225.

In the data storage area 215, although not shown in detail, various initial values 215a, various conditions 215b and a dual optimal solution problem database 215c are stored. Further, a standardized matrix or the like may be stored as the database 215c.

The program storage area 225 holds, an optimality criteria module 225a, a sequential convex function approximation module 225b, a sequential linear programming module 225c, and other method modules 225d, which are used as solutions in design variable vector, and a conjugate residual module 225e, a GCR module 225f, a GCR(k) module 225g, an Orthomin(k) module 225h, a GMREG(k) module 225i, and other method modules 225j, which are used as solutions in status variable vector. A module corresponding to a method selected from the programs stored in the program storage area 225 is loaded into the program storage area 224 of the primary storage unit 204 and executed by the CPU 201, thereby the structure optimal designing method of the present embodiment is realized.

Note that the conjugate residual module 225e may be a conjugate gradient module shown in another example. Further, it may be arranged such that both of the conjugate residual module and the conjugate gradient module are held and selectively used.

That is, the structure optimal designing apparatus having a first solution module to solve an optimization problem of a first evaluation functional for a status variable vector and a design variable vector and a second solution module to solve an optimization problem of a second evaluation functional for said status variable vector and said design variable vector, for obtaining a solution of a structure optimal designing problem, formulated as a dual optimization problem, wherein said status variable vector is a displacement in each node, said design variable vector is an existence ratio of a structural member in each element, and said second evaluation function at said second solution module comprises a norm of residual vector, and said status variable vector is not initialized upon start of said second solution module. At said first solution module, any one of a sequential linear programming method, an optimality criteria method, and a sequential convex function approximate method is executed. At said second solution process, any one of a conjugate residual method, a GCR method, a GCR(k) method, an Orthomin(k) method, a GMRES(k) method and their derivative methods is executed.

Further, the structure optimal designing apparatus having a first solution module to solve an optimization problem of a first evaluation functional for a status variable vector and a design variable vector and a second solution module to solve an optimization problem of a second evaluation functional for said status variable vector and said design variable vector, for obtaining a solution of a structure optimal designing problem, formulated as a dual optimization problem, wherein said status variable vector is a displacement in each node, said design variable vector is an existence ratio of a structural member in each element, said second solution module comprising a conjugate gradient method and including a preconditioning means for executing preconditioning on a nodal force vector based on a global stiffness matrix, and said status variable vector is not initialized upon start of said second solution process. At said preconditioning means, a component in a row or column of the nodal force vector is set to 0 when a diagonal component in the corresponding row or column of the global stiffness matrix becomes 0. At said first solution module, any one of a sequential linear programming method, an optimality criteria method, and a sequential convex function approximate method is performed.

<Formulation of Structure Optimization Problem>

For the following description, a structure optimization problem is formulated.

Assuming that argument functions are represented as finite dimensional vectors by finite element formulation, the argument function evaluation functional becomes a variable vector evaluation function. Hereinbelow, descriptions will be made based on the above assumption.

The status variable vector x and the design variable vector f are represented as follows as matrix vectors.

$$x = (x_1, x_2, \ldots, x_m)^T \quad (1)$$

$$f = (f_1, f_2, \ldots, f_n)^T \quad (2)$$

In the expressions, "T" means transposition. "x" is an m-dimensional vector, and "f", an n-dimensional vector. In a structure optimization problem, a status variable vector is formed with displacement of node, and a design variable vector is formed with the rate of existence of structural member in each element.

For example, in a structure optimization problem in a two-dimensional plane, if a design area is divided in vertical $n_y$ and lateral $n_x$ elements, As the number of elements n, $(n_x \times n_y)$ holds, and as the number of nodes, $(n_x+1) \times (n_y+1)$ holds.

As the status variable vector is represented as a pair of vertical displacement and lateral displacement of each node, as the dimension m of the status variable vector x, $2 \times (n_x+1) \times (n_y+1)$ holds.

The boundary condition for x is normally given as a displacement constraint condition. The condition is described as $B_1$.

$$B_1(x) = 0 \quad (3)$$

The evaluation functions for the status variable vector x and the design variable vector f, $L_1$ and $L_2$, are defined as follows.

$$L_1 := L_1(x, f) = (b - Ax)^T (b - Ax) \quad (4)$$

$$L_2 := L_2(f, x) = (\tfrac{1}{2}) x^T A x \quad (5)$$

Note that "A" is a global stiffness matrix, and "b" is a nodal force vector. The vector b is previously given. The matrix A is a function of the design variable vector f.

The global stiffness matrix can be formed by superposition of element stiffness matrix $A_j$ over an element j. In the case of plane strain problem, the element stiffness matrix in consideration of the design variable vector i.e. the rate of existence $f_j$ of structure element is as follows. Note that 4 node elements are employed as two-dimensional elements and the element displacement vector $x_j$ is made as follows.

$$X_j = (u_1, v_1, U_2, V_2, \ldots, U_4, V_4) \quad (6)$$

"$u_k$" and "$V_k$" are horizontal displacement and lateral displacement of a node k.

The element stiffness matrix corresponding to the element displacement vector in the expression (6) is represented as follows.

$$A_j = f_j^\xi \begin{bmatrix} a_{1,1} & b_{1,1} & a_{1,2} & b_{1,2} & a_{1,3} & b_{1,3} & a_{1,4} & b_{1,4} \\ c_{1,1} & d_{1,1} & c_{1,2} & d_{1,2} & c_{1,3} & d_{1,3} & c_{1,4} & d_{1,4} \\ a_{2,1} & b_{2,1} & a_{2,2} & b_{2,2} & a_{2,3} & b_{2,3} & a_{2,4} & b_{2,4} \\ c_{2,1} & d_{2,1} & c_{2,2} & d_{2,2} & c_{2,3} & d_{2,3} & c_{2,4} & d_{2,4} \\ a_{3,1} & b_{3,1} & a_{3,2} & b_{3,2} & a_{3,3} & b_{3,3} & a_{3,4} & b_{3,4} \\ c_{3,1} & d_{3,1} & c_{3,2} & d_{3,2} & c_{3,3} & d_{3,3} & c_{3,4} & d_{3,4} \\ a_{4,1} & b_{4,1} & a_{4,2} & b_{4,2} & a_{4,3} & b_{4,3} & a_{4,4} & b_{4,4} \\ c_{4,1} & d_{4,1} & c_{4,2} & d_{4,2} & c_{4,3} & d_{4,3} & c_{4,4} & d_{4,4} \end{bmatrix} \quad (7)$$

In the expression, $$a_{i,j} = (\lambda + 2\mu) \langle \partial_x e_i, \partial_x e_j \rangle + \mu \langle \partial_y e_i, \partial_y e_j \rangle \quad (8)$$

$$b_{i,j} = \lambda \langle \partial_x e_i, \partial_y e_j \rangle + \mu \langle \partial_x e_j, \partial_y e_i \rangle \quad (9)$$

$$c_{i,j} = \lambda \langle \partial_x e_j, \partial_x e_i \rangle + \mu \langle \partial_x e_i, \partial_y e_j \rangle \quad (10)$$

$$d_{i,j} = (\lambda + 2\mu) \langle \partial_y e_i, \partial_y e_j \rangle + \mu \langle \partial_x e_i, \partial_x e_j \rangle \quad (11)$$

"$e_j$" is a basic vector to a node j, and angle brackets $\langle , \rangle$ represent a vector inner product. "$\partial_x$" is a partial differential for x, and "$\partial_y$", a partial differential for y. The value of "$\xi$", in accordance with the above-described (non-patent document 4), is 2. further, "$\lambda$" and "$\mu$" are material constants, which are referred to as Lame's constants, calculated from Young's modulus E and Poisson ratio v as follows.

$$\lambda = Ev/(1+v)(1-2v) \quad (12)$$

$$\mu = E/\{2(1+v)\} \quad (13)$$

As it is easily understood from the expression (7), if the rate of existence of an element is 0, all the components of the element stiffness matrix $A_j$ are 0. As the global stiffness matrix is formed by superposition of element stiffness matrix, if the design variable $f_j$ of element including the node j is 0, all the components of row and column corresponding to the node j of the global stiffness matrix are 0. In this manner, the global stiffness matrix in the structure optimization problem is generally a singular matrix.

The constraint condition for the design variable in the case of structure optimal designing is an upper limit value $W_0$ of total weight.

$$W(f) = \sum_{j=1}^{j=n} f_i \leq W_0 \quad (14)$$

Further, the constraint condition for the range of value of the design variable is as follows.

$$0 \leq f_j \leq 1 \ j = 1, \ldots, n \quad (15)$$

From the above expressions, the optimal designing problems is formulated as a problem to minimize the expression (5) under the constraint conditions (14) and (15).

Further, the status variable x can be obtained as a solution to minimize the expression (4) under the constraint condition (3).

<Operation of Structure Optimal Designing Apparatus>

Next, a processing procedure according to the present embodiment will be described based on the above formulation.

Figure 3:
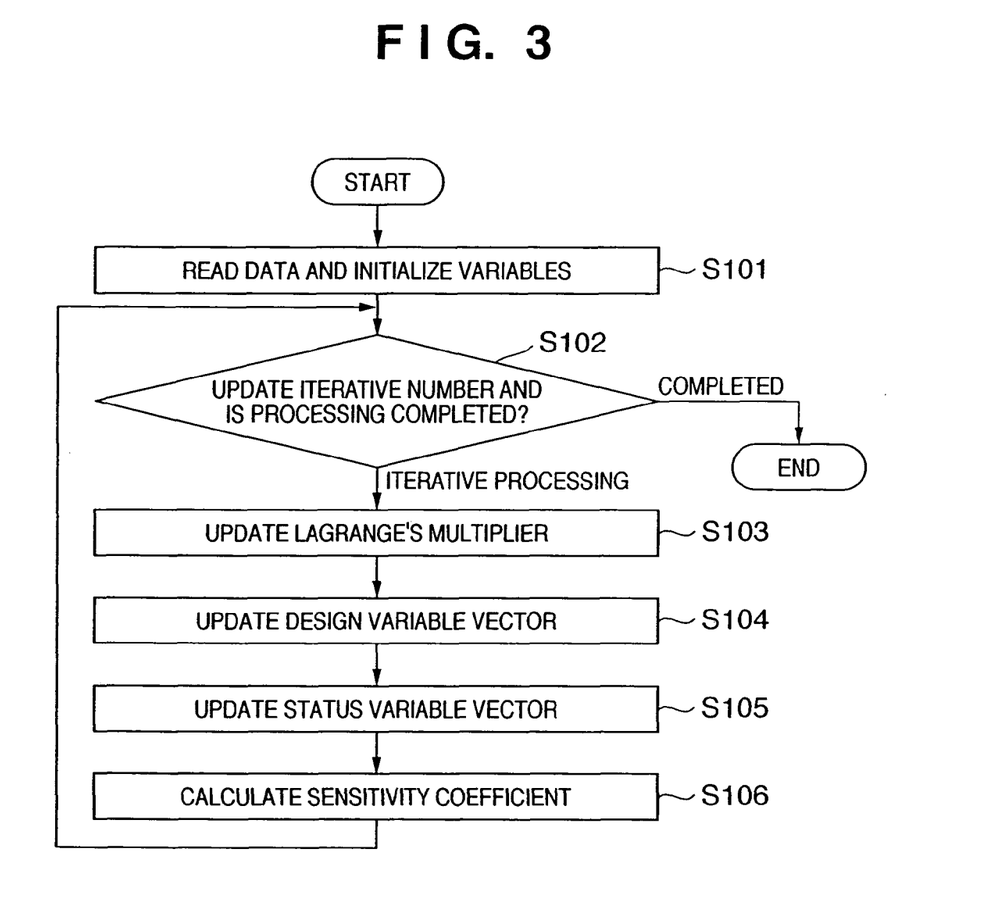
FIG. 3 is a flowchart showing a processing procedure according to the embodiment.

FIG. 3 is a flowchart showing the processing procedure according to the embodiment.

In FIG. 3, at step S101, data in a system to be simulated is read, and variable initialization is performed. As the data reading, input data may be read from the input unit 203 or the communication unit 206, or data previously stored in the secondary storage unit 205 as a file, may be read. The data of the system includes the x and f initial values $x^{(0)}$ and $f^{(0)}$, the boundary condition B, and the evaluation functions $L_1$ and $L_2$. The program ensures a necessary variable areas in the primary storage unit 204 based on the information, and set values. A sensitivity coefficient initial value $C_j^{(0)}$ is calculated by $$C_j^{(0)} = -(x_j^{(0)})^T (\xi (f_j^{(0)})^{\xi-1} A_j) x_j^{(0)} \tag{16}$$

At step S102, the number of repetitions k is initialized to 1. The number of repetitions k indicates repetitive processing on the above-described design variable solution process. The repetitive processing is terminated when a predetermined termination condition (conditions of evaluation functions $L_1$ and $L_2$) is satisfied.

At step S103, the Lagrange's undetermined constant $\lambda$ is updated. At step S104, the design variable vector f is updated. At step S105, the status variable vector x is updated. At step S106, the sensitivity coefficient is calculated.

The above-described steps S103 and S104 differ in accordance with method employed as a solution of constraint-conditioned optimization problem. For example, the solution step of calculating the design variable vector $f^{(k)}$ is realized by one of a sequential linear programming, an optimality criteria method, and a sequential convex function approximate method. Hereinbelow, the case of optimality criteria method and the case of sequential convex function approximate method as the solution will be described.

(Optimality Criteria Method)

First, the case where the optimality criteria method will be described. An optimality criteria method for a structure optimization problem is well known as disclosed in the (non-patent document 4), the (non-patent document 5) and the like.

In the optimality criteria method, the expressions (4) and (5) are combined into one expression by using the Lagrange's undetermined constant $\lambda$.

$$L(f,\lambda) = L_2(f,x) - \lambda(W(f) - W_0) \tag{17}$$

The updating of the Lagrange undetermined constant $\lambda$ at step S103 is made by using the following expression.

$$\lambda^{(k+1)} = \min[0, [(1/W_0) W(f^{(k)})]^\alpha \lambda^{(k)}] \tag{18}$$

Note that the superscripts "k" and "k+1" represent the number of repetitions. Further, "$\alpha$" is a power coefficient generally set to about 0.85.

The updating of the design variable at step S104 is made by the following expression.

$$f_j^{(k)} = \max[(1-\zeta)f_j^{(k-1)}, 0] \text{ if } s_j^{(k-1)} \le \max[(1-\zeta)f_j^{(k-1)}, 0] \tag{19}$$
$$= \min[(1+\zeta)f_j^{(k-1)}, 1] \text{ if } \min[(1+\zeta)f_j^{(k-1)}, 1] \le s_j^{(k-1)}$$
$$= s_j^{(k-1)} \text{ otherwise}$$

Note that "$\zeta$" is a constraint value of variation amplitude of the updating of the design variable, and is set to about 0.3. Further, "$s_j^{(k)}$" is given by $$s_j^{(k)} = [(1/\lambda^{(k-1)}) C_j^{(k-1)}]^\alpha f_j^{(k-1)} \tag{20}$$

Note that "$C_j^{(k)}$", is an amount called a sensitivity coefficient for the design variable $f_j^{(k)}$ in the second evaluation function $L_2$ calculated by the processing at step S106.

Further, if the value of the design variable $f_j^{(k)}$ calculated by the expression (19) is less than a predetermined value, it may be forcibly set to 0. the predetermined value is, e.g., about $10^{-3}$.

At step S105, the status variable vector $x^{(k)}$ is updated.

The status variable vector $x^{(k)}$ is obtained in process of minimization of the evaluation function by the expression (4). This solution is referred to as a conjugate residual method to be described later.

At step S106, the sensitivity coefficient $C_j^{(k)}$ is calculated by $$C_j^{(k)} = -(X_j^{(k)})^T (\xi (f_j^{(k)})^{\xi-1} A_j) x_j^{(k)} \tag{21}$$

(Sequential Convex Function Approximation Method)

Next, the processing at steps S103 and S104 in a case using the sequential convex function approximate method will be described. In the sequential convex function approximate method, a numerical calculation error can be avoided by scaling of respective components of the design variable vector, however, for the sake of simplification of explanation, no description will be made about the scaling. The details of the sequential convex function approximate method are well known as disclosed in the (reference document 1), (reference document 2) and the like.

(Reference document 1) Fujii: "Structural Design Solved by Personal Computer", Maruzen (April 2002)

(Reference document 2) C. Fleury: "CONLIN, an efficient dual optimizer based on convex approximation concepts", Structural Optimization, 1, pp. 81-89 (1989)

At step S103, the Lagrange undetermined constant is updated by the following expression.

$$\lambda^{(k)} = \lambda^{(k-1)} + \Delta\lambda^{(k)} \tag{22}$$

Note that an initial value $\lambda^{(0)}$ is set to e.g. about 0.01. "$\Delta\lambda^{(k)}$" is given as a solution of the following equation.

$$\Delta\lambda^{(k)} = 2 \times (1 - W_0/W(f^{(k-1)})) \lambda^{(k-1)} \tag{23}$$

At step S104, the design variable vector is updated.

$$f_j^{(k)} = (g^{(k)}/\lambda^{(k)})^{1/2} \quad \text{if} \quad 0 < (g^{(k)}/\lambda^{(k)}) < 1 \tag{24}$$
$$= 0 \quad \text{if} \quad g^{(k)}/\lambda^{(k)} \le 0$$
$$= 1 \quad \text{if} \quad 1 \le g^{(k)}/\lambda^{(k)}$$

Note that $g^{(k)} = -(f_j^{(k-1)})^2 C_j^{(k-1)} \tag{25}$

Further, if the value of the design variable $f_j^{(k)}$ calculated by the expression (24) is less than a predetermined value, it may be forcibly set to 0. The predetermined value is, e.g., about $10^{-3}$.

The processing at steps S105 and S106 is as described above.

<Calculation and Updating of Status Variable Vector>

(Example of Conjugate Residual Method)

The solution process to calculate the status variable vector $x^{(k)}$ at step S105 is realized by a conjugate residual method, a GCR method, a GCR(k) method, an Orthomin(k) method, a GMRES(k) method, or derivative methods of these methods. Hereinbelow, an example of processing using the conjugate residual method as a representative method will be described with reference to FIG. 4.

Figure 4:
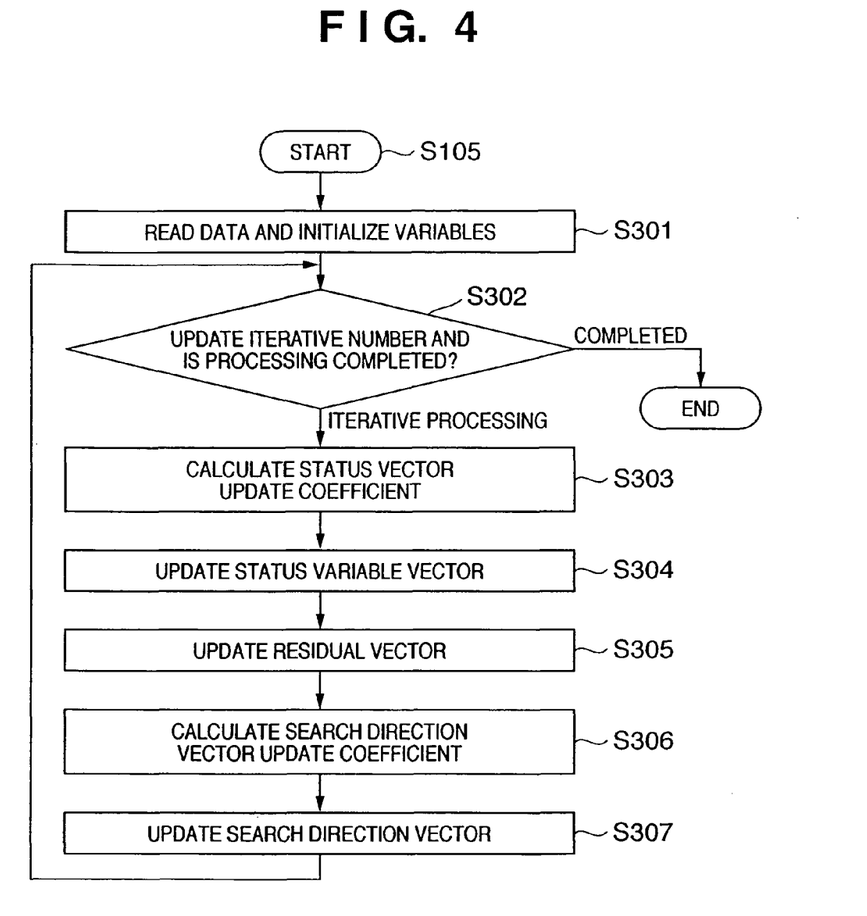
FIG. 4 is a flowchart showing an example of processing at step S105 in FIG. 3 in detail.

At step S301, data in a system to be simulated is read. The data of the system includes an initial value of the status variable vector $x^{(k)}$, the value of the design variable vector $f^{(k)}$, the displacement constraint condition B, and the evaluation function $L_1$. The program ensures necessary variable areas in the primary storage unit 204 based on the information, and set values. The status variable vector x, the residual vector r, and the search direction vector p are initialized to $X^{(0)}$, $r^{(0)}$ and $p^{(0)}$.

First, the residual vector initial value $r^{(0)}$ is calculated by using the status variable vector initial value $X^{(0)}$ and the nodal force vector b describing a force applied to each node (joint).

$$r^{(0)} = b - Ax^{(0)} \qquad (26)$$

The search direction vector initial value $p^{(0)}$ is equal to the residual vector initial value $r^{(0)}$.

At step S302, the number of repetitions t is initialized to 1. The number of repetitions t indicates repetitive processing on the above-described status variable solution process. The repetitive processing is terminated when the number of repetitions of processing at the following steps S303 to S307 exceeds a set value or when the square of the norm of the residual vector $r^{(1)}$ is less than a predetermined value. Hereinbelow, the value for t-th repetition will be represented as $x^{(t)}$.

At step S303, a status vector update coefficient $\alpha^{(t)}$ is calculated.

$$\alpha^{(t-1)} = (r^{(t-1)}, Ap^{(t-1)})/(Ap^{(t-1)}, Ap^{(t-1)}) \qquad (27)$$

At step S304, the status variable vector x is updated.

$$x^{(t)} = x^{(t-1)} + \alpha^{(t-1)} p^{(t-1)} \qquad (28)$$

At step S305, the residual vector $r^{(t-1)}$ is calculated as follows.

$$r^{(t)} = r^{(t-1)} - \alpha^{(t-1)} Ap^{(t-1)} \qquad (29)$$

At step S306, an update coefficient P of the search direction vector p is calculated.

$$\beta^{(t)} = -(Ar^{(t)}, Ap^{(t-1)})/(Ap^{(t-1)}, Ap^{(t-1)}) \qquad (30)$$

At step S307, the search direction vector p is updated.

$$p^{(t)} = r^{(t)} + \beta^{(t-1)} p^{(t-1)} \qquad (31)$$

(Example of Conjugate Gradient Method)

Figure 5:
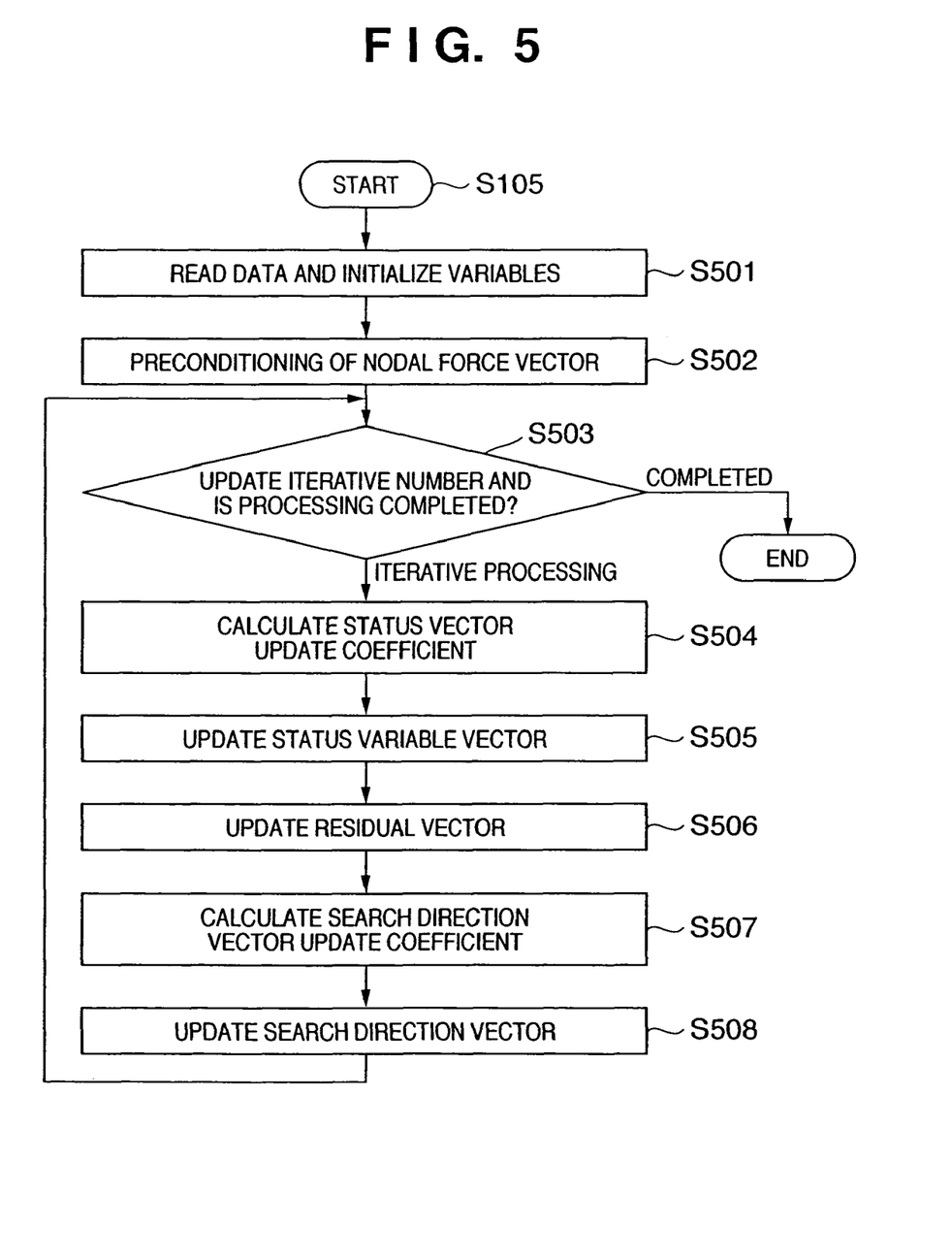
FIG. 5 is a flowchart showing another example of the processing at step S105 in FIG. 3 in detail.

Next, an example of processing using the conjugate gradient method as a solution process for calculation of the status variable vector $x^{(k)}$ at step S105 will be described with reference to FIG. 5.

At step S501, data in a system to be simulated is read. The data of the system includes the initial value $x^{(0)}$ of the status variable vector $x^{(k)}$, the initial value $f^{(0)}$ of the design variable vector $f^{(k)}$, the displacement constraint condition $B_1$, and the evaluation function $L_1$. The program ensures a necessary variable areas in the primary storage unit 204 based on the information, and set values. The residual vector r and the search direction vector p are initialized to $r^{(0)}$ and $p^{(0)}$ First, the residual vector initial value $r^{(0)}$ is calculated by using the status variable vector initial value $x^{(0)}$ and the nodal force vector b describing a force applied to each node (joint).

$$r^{(0)} = b - Ax^{(0)} \qquad (32)$$

The search direction vector initial value $p^{(0)}$ is equal to the residual vector initial value $r^{(0)}$.

At step S502, preconditioning is performed. First, among diagonal components of the global stiffness matrix A, a row or column number which becomes 0 is detected. If there is no component which becomes 0, the process proceeds to step S503 without any processing. On the other hand, if there is a component which becomes 0, a component of b (nodal force vector) with a number corresponding to the component is set to 0.

At step S503, the number of repetitions t is initialized to 1. The number of repetitions t indicates repetitive processing on the above-described status variable solution process. The repetitive processing is terminated when the number of repetitions of processing at the following steps S504 to S508 exceeds a set value or when the square of the norm of the residual vector $r^{(t)}$, ($r^{(t)}$, $r^{(t)}$) is less than a predetermined value. Hereinbelow, the value for t-th repetition will be represented as $x^{(t)}$.

At step S504, a status vector update coefficient $\alpha^{(t)}$ is calculated.

$$\alpha = (r^{(t-1)}, p^{(t-1)})/(p^{(t-1)}, Ap^{(t-1)}) \qquad (33)$$

At step S505, the status variable vector x is updated.

$$x^{(t)} = x^{(t-1)} + \alpha p^{(t-1)} \qquad (34)$$

At step S506, the residual vector $r^{(t)}$ is calculated as follows.

$$r^{(t)} = b - Ax^{(t-1)} \qquad (35)$$

At step S507, an update coefficient β of the search direction vector p is calculated.

$$\beta = (r^{(t)}, r^{(t)})/(r^{(t-1)}, r^{(t-1)}) \qquad (36)$$

Note that if t=1 holds, β=1 holds.

At step S508, the search direction vector p is updated.

$$p^{(t)} = r^{(t)} + \beta p^{(t-1)} \qquad (37)$$

The conjugate residual method, the conjugate gradient method and their various derivative methods are well-known as disclosed in (Reference Document 3), (Reference Document 4), (Reference Document 5), (Reference Document 6), (Reference Document 7) and the like. It has been shown that these methods attain convergence in a stable manner even in a case where a coefficient matrix A is singular.

(Reference Document 3) Mori, Sugihara and Murota: "Linear Computation", Iwanami Kohza Applied Mathematics, Iawanami-Shoten (1994)

(Reference Document 4) Hayami: "On the convergence of GCR(k) on singular system", Kyoto University Mathematical Analysis Research Laboratory, transcript of lectures and studies 1265 (2002)

(Reference Document 5) Abe, Ogata, Sugihara, Zhang, Mitsui: "Convergence of CR on simultaneous linear equations having singular coefficient matrix", Japan Journal of Industrial and Applied Mathematics, Vol. 9, No. 1, pp. 1-13 (1999)

(Reference Document 6) K. Hayami: "On the Behavior of the Conjugate Residual Method for Singular Systems", NII Technical Report, NII-2001-002E (2002)

(Reference Document 7) S-L. Zhang, Y. Oyanagi, M. Sugihara: "Necessary and sufficient conditions for the convergence of Orthomin(k) on singular and inconsistent systems", Numerische Mathemarik, 87, pp. 391-405 (2000)

(Particular Example of Structure Optimal Designing of Present Embodiment)

In this example, the present embodiment is applied to automatic designing of optimal shape of a cantilever which receives a load applied to an arbitrary position. For the sake of simplification of explanation, the designing is limited to a plan strain problem.

Figure 6:
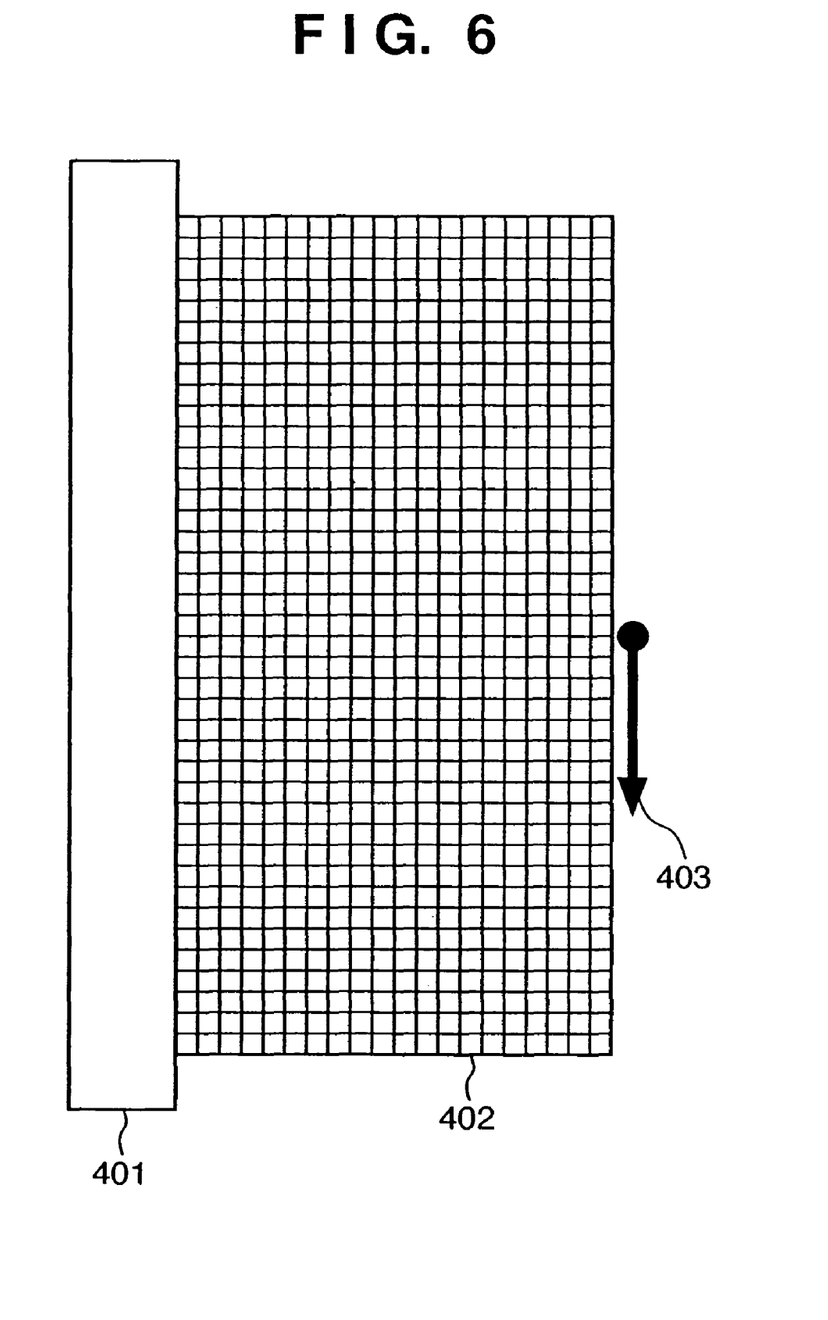
FIG. 6 is an explanatory diagram of setting of particular problem according to the embodiment.

As shown in FIG. 6, a design area where structural members exist is a rectangle 402 divided by vertical $n_y$ and lateral $n_x$ at equal intervals in accordance with the finite element method. Each divided partial area is called a cell. The cells are numbered such that a bottom left cell is (1, 1) and a top right cell is ($n_y$, $n_x$).

Similarly, each grid point is called a node. The nodes are numbered such that a bottom left node is (1,1) and a top right node is $(n_y+1, n_x+1)$.

In FIG. 6, numeral 401 denotes a support member; and 403, a load vector.

A characteristic function value f(j,k) corresponds to a cell (j,k). The characteristic function value is a variable having a positive real value ranging from 0 to 1, indicating the rate of existence of structural member in the cell (j,k). The characteristic function value is an element of the design variable vector f of the present embodiment.

$$f=(f(1,1), f(1,2), \ldots, f(n_y, n_x))^T \quad (38)$$

Similarly, a lateral displacement u(j,k) and a vertical displacement v(j,k) correspond to the node (j,k). They are real numbers having an arbitrary value, and are elements of the status variable vector x of the present embodiment.

$$X=(u(1,1), v(1,1), u(1,2), v(1,2), \ldots, u(n_y+1, n_x+1), v(n_y+1, n_x+1))^T \quad (39)$$

Figure 7:
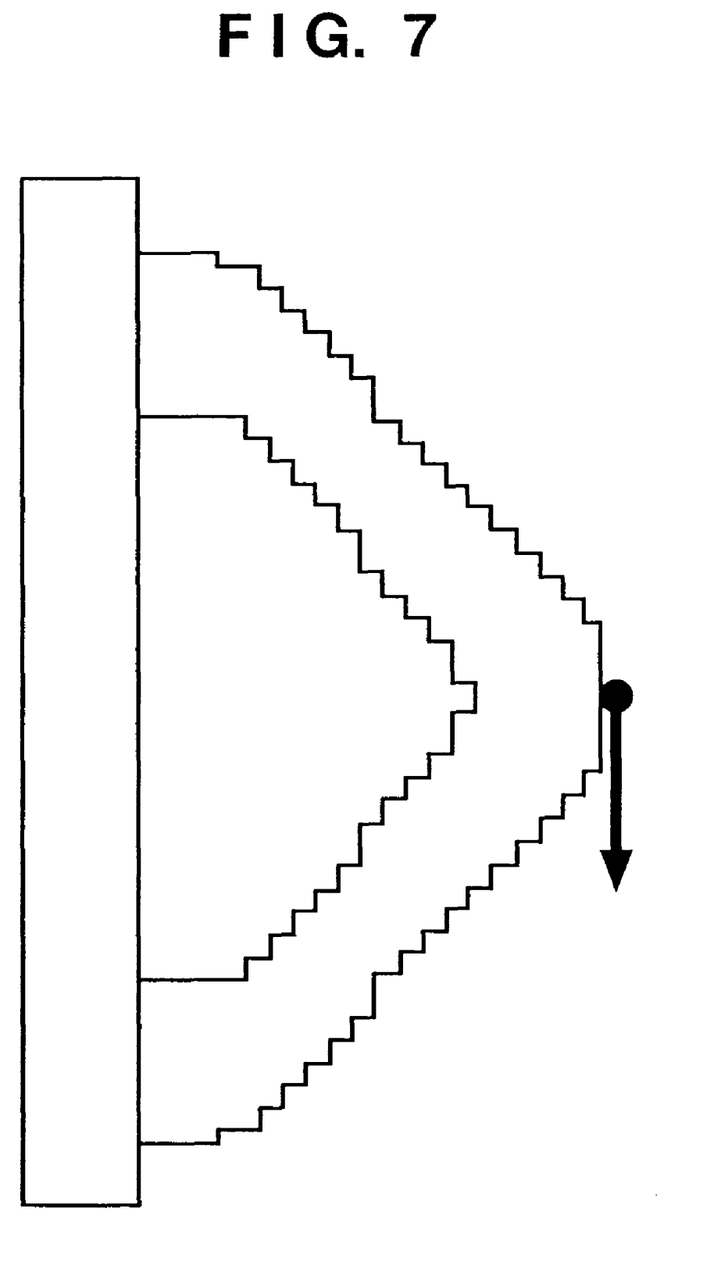
FIG. 7 is an explanatory diagram of the result of computation of the problem in FIG. 6 according to the embodiment.

FIG. 7 shows the result of computation. In FIG. 7, a black area indicates an area where the structural member exists. In the present example, the vertical-to-lateral aspect ratio of structural members in the design area is 2/1. The analytical solution is a combination of ±45° beams with respect to a horizontal direction. The result of computation in FIG. 7 corresponds with the analytical solution.

In the present embodiment, the apparatus has been described as one system where the respective units are connected to the bus line 207. However, the system may be realized as plural devices by connecting the respective elements via a network or the like. Otherwise, plural general computers may be connected for execution of multiple-processing or distributed processing in parallel.

Further, the present invention includes a program to realize the above-described structure optimal designing method and a storage medium holding the program in a computer-readable manner.

The present invention is not limited to the above embodiments and various changes and modifications can be made within the spirit and scope of the present invention. Therefore, to appraise the public of the scope of the present invention, the following claims are made.

What is claimed is:

1. A method of optimally designing a structure in an area comprising a step of obtaining a solution of a structure optimal designing problem having a first solution process to solve an optimization problem of a first evaluation function for a status variable vector and a design variable vector, wherein the design variable vector is a rate of existence to a structural member in each divided area of the area, and the status variable vector is a displacement in each node of the divided area, said first solution process comprising:

a design variable update step of reading the design variable vector and the status variable vector stored in a first storage unit, updating the design variable vector, and storing the updated design variable vector into said first storage unit;

a status variable update step of (a) reading the design variable vector and the status variable vector stored in a second storage unit, (b) performing a second solution process to solve an optimization problem of a second evaluation function for the status variable vector and the design variable vector so as to obtain the status variable vector which minimizes the second evaluation function as a solution, wherein the second evaluation function corresponds to a norm of a residual vector which is obtained as a difference between a nodal force vector and the status variable vector on which a global stiffness matrix is operated, and said second solution process comprising a conjugate gradient method, and including a preconditioning step of executing preconditioning on a nodal force vector based on a global stiffness matrix, (c) updating the status variable vector with the solution of the optimization problem of the second evaluation function, and (d) storing the updated status variable vector into said second storage unit;

a determination step of determining whether the update in said design variable update step and the update in said status variable update step are to be terminated; and an output step of outputting an image of the structure corresponding to the design variable vector and the status variable vector after the updates are terminated, and otherwise returning to said design variable update step to update the design variable vector, wherein at said preconditioning step, when a diagonal component of the global stiffness matrix is 0, a component of the nodal force vector corresponding to a row or column including the diagonal component is set to 0.

2. The method according to claim 1, wherein at said first solution process, any one of a sequential linear programming method, an optimality criteria method, and a sequential convex function approximate method is performed.

3. An information processing apparatus for optimally designing a structure in an area by obtaining a solution of a structure optimal designing problem having a first solution process to solve an optimization problem of a first evaluation function for a status variable vector and a design variable vector, wherein the design variable vector is a rate of existence to a structural member in each divided area of the area, and the status variable vector is a displacement in each node of the divided area, said apparatus comprising a first solution module adapted to execute said first solution process and comprising:

design variable update means for reading the design variable vector and the status variable vector stored in a first storage unit, updating the design variable vector, and storing the updated design variable vector into said first storage unit;

status variable update means for (a) reading the design variable vector and the status variable vector stored in a second storage unit, (b) performing a second solution process to solve an optimization problem of a second evaluation function for the status variable vector and the design variable vector so as to obtain the status variable vector which minimizes the second evaluation function as a solution, wherein the second evaluation function corresponds to a norm of a residual vector which is obtained as a difference between a nodal force vector and the status variable vector on which a global stiffness matrix is operated, and said second solution process comprising a conjugate gradient method, and including a preconditioning step of executing preconditioning on a nodal force vector based on a global stiffness matrix, (c) updating the status variable vector with the solution of the optimization problem of the second evaluation function, and (d) storing the updated status variable vector into said second storage unit;

determination means for determining whether the update by said design variable update means and the update by said status variable update means are to be terminated; and output means for outputting an image of the structure corresponding to the design variable vector and the status variable vector after the updates are terminated, and otherwise repeating the update of the design variable vector by said design variable update means, wherein in the preconditioning step, when a diagonal component of the global stiffness matrix is 0, a component of the nodal force vector corresponding to a row or column including the diagonal component is set to 0.

4. The information processing apparatus according to claim 3, wherein said first solution module performs any one of a sequential linear programming method, an optimality criteria method, and a sequential convex function approximate method.

5. A program stored in a computer-readable storage medium to be executed by an information processing apparatus for optimally designing a structure in an area, and comprising a module of obtaining a solution of a structure optimal designing problem having a first solution process to solve an optimization problem of a first evaluation function for a status variable vector and a design variable vector, wherein the design variable vector is a rate of existence to a structural member in each divided area of the area, and the status variable vector is a displacement in each node of the divided area, said module comprising a first solution module adapted to execute said first solution process and comprising:

a design variable update step of reading the design variable vector and the status variable vector stored in a first storage unit, updating the design variable vector, and storing the updated design variable vector into said first storage unit;

a status variable update step of (a) reading the design variable vector and the status variable vector stored in a second storage unit, (b) performing a second solution process to solve an optimization problem of a second evaluation functional for the status variable vector and the design variable vector so as to obtain the status variable vector which minimizes the second evaluation function as a solution, wherein the second evaluation function corresponds to a norm of a residual vector which is obtained as a difference between a nodal force vector and the updated status variable vector on which a global stiffness matrix is operated, and said second solution process comprising a conjugate gradient method, and including a preconditioning step of executing preconditioning on a nodal force vector based on a global stiffness matrix, (c) updating the status variable vector with the solution of the optimization problem of the second evaluation function, and (d) storing the updated status variable vector into said second storage unit;

a determination step of determining whether the update in said design variable update step and the update in said status variable update step are to be terminated; and an output step of outputting an image of the structure corresponding to the design variable vector and the status variable vector after the updates are terminated, and otherwise returning to said design variable update step to update the design variable vector, wherein at said preconditioning step, when a diagonal component of the global stiffness matrix is 0, a component of the nodal force vector corresponding to a row or column including the diagonal component is set to 0.

* * * * *